(No Model.) 9 Sheets—Sheet 1

A. G. WILKINS & M. J. BARTLETT.
BUTTON SETTING MACHINE.

No. 334,321. Patented Jan. 12, 1886.

(No Model.) 9 Sheets—Sheet 4.

A. G. WILKINS & M. J. BARTLETT.
BUTTON SETTING MACHINE.

No. 334,321. Patented Jan. 12, 1886.

WITNESSES
P. W. Hale,
W. R. James,

INVENTORS
Alex. G. Wilkins
Marcus J. Bartlett
by R. K. Evans
Attorney (No Model.) 9 Sheets—Sheet 5.

A. G. WILKINS & M. J. BARTLETT.
BUTTON SETTING MACHINE.

No. 334,321. Patented Jan. 12, 1886.

WITNESSES
P. W. Hale
W. B. James

INVENTORS
Alex. G. Wilkins
Marcus J. Bartlett
by R. K. Evans
Attorney (No Model.) 9 Sheets—Sheet 6.
A. G. WILKINS & M. J. BARTLETT.
BUTTON SETTING MACHINE.
No. 334,321. Patented Jan. 12, 1886.
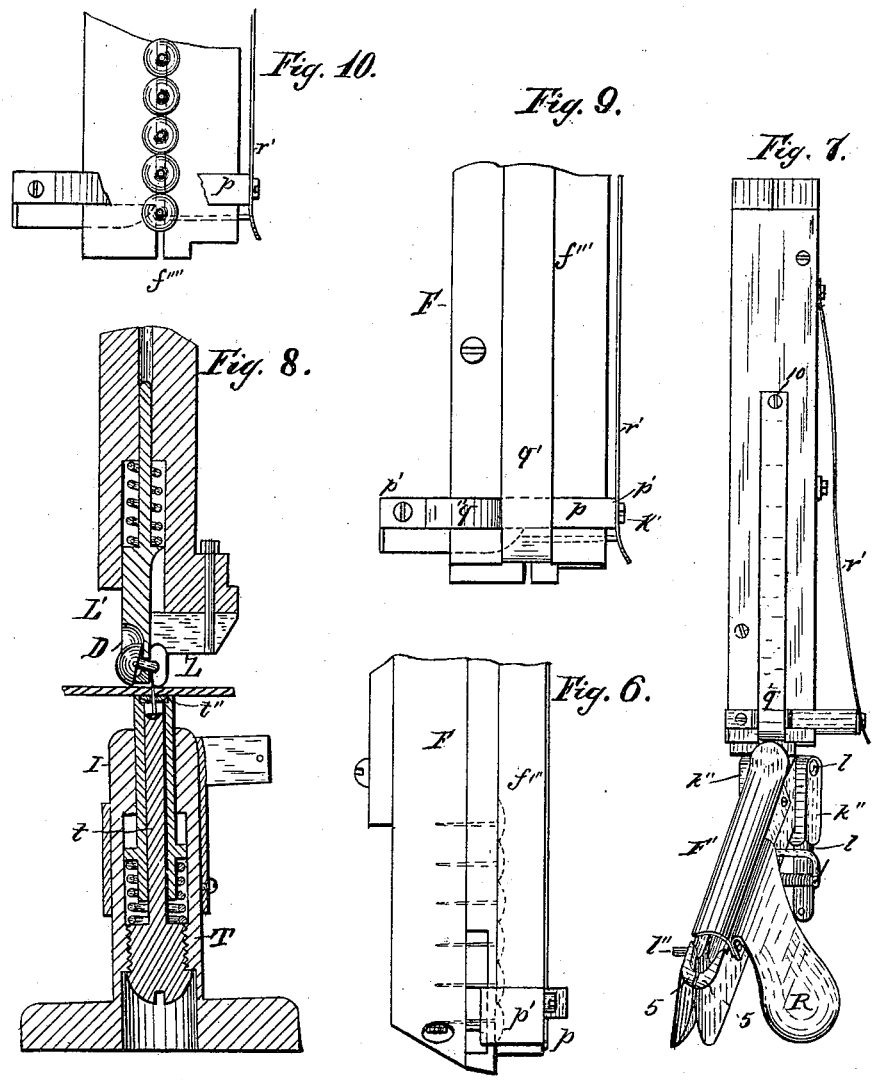
WITNESSES
P W Hale
N R James
INVENTORS
Alex. G. Wilkins
Marcus J. Bartlett
by R. K. Evans
Attorney (No Model.)  9 Sheets—Sheet 7.

A. G. WILKINS & M. J. BARTLETT.
BUTTON SETTING MACHINE.

No. 334,321. Patented Jan. 12, 1886.

WITNESSES
P. W. Hale,
W. R. James.

INVENTORS
Alex. G. Wilkins
Marcus J. Bartlett
by R. K. Evans
Attorney (No Model.) 9 Sheets—Sheet 8.
A. G. WILKINS & M. J. BARTLETT.
BUTTON SETTING MACHINE.
No. 334,321. Patented Jan. 12, 1886.
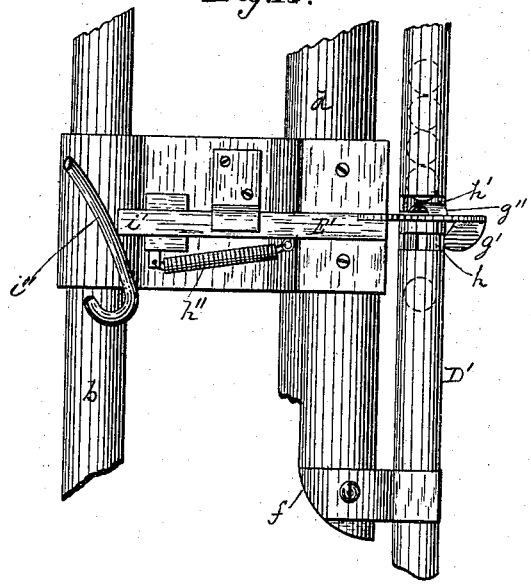
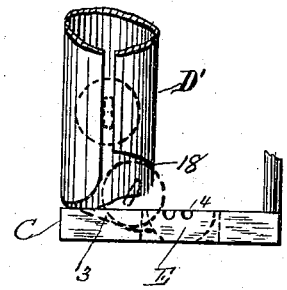
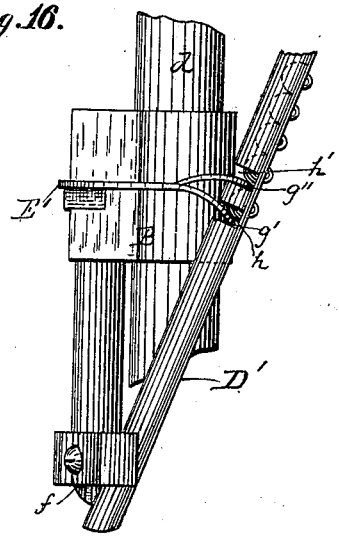

(No Model.) 9 Sheets—Sheet 9.

A. G. WILKINS & M. J. BARTLETT.
BUTTON SETTING MACHINE.

No. 334,321. Patented Jan. 12, 1886.

WITNESSES
P. N. Hale
W. R. James

INVENTORS
Alex. G. Wilkins
Marcus J. Bartlett
by R. K. Evans
Attorney

UNITED STATES PATENT OFFICE.

ALEXANDER G. WILKINS, OF MEADVILLE, PENNSYLVANIA, AND MARCUS J. BARTLETT, OF CHARDON, OHIO, ASSIGNORS TO THE RAILWAY SPEED RECORDER COMPANY, OF KENT, OHIO.

BUTTON-SETTING MACHINE.

SPECIFICATION forming part of Letters Patent No. 334,321, dated January 12, 1886.

Application filed September 2, 1885. Serial No. 176,020. (No model.)

*To all whom it may concern:*

Be it known that we, ALEXANDER G. WILKINS, of Meadville, in the county of Crawford and State of Pennsylvania, and MARCUS J. BARTLETT, of Chardon, in the county of Geauga and State of Ohio, have invented a new and Improved Automatic Machine for Securing Buttons to Fabrics; and we hereby declare the following to be a full, clear, and exact description of the same, reference being had to the accompanying drawings, making part of this specification, in which—

Figure 1:
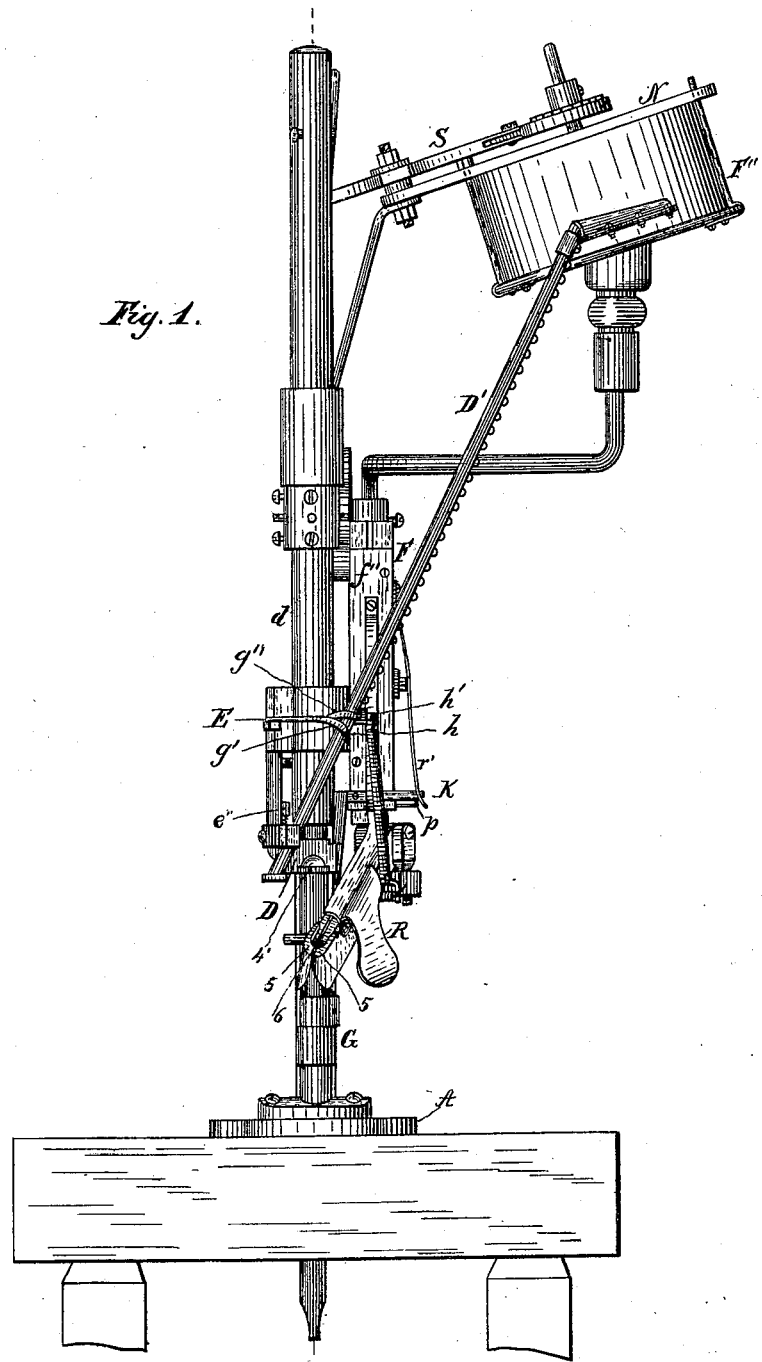
Figure 2:
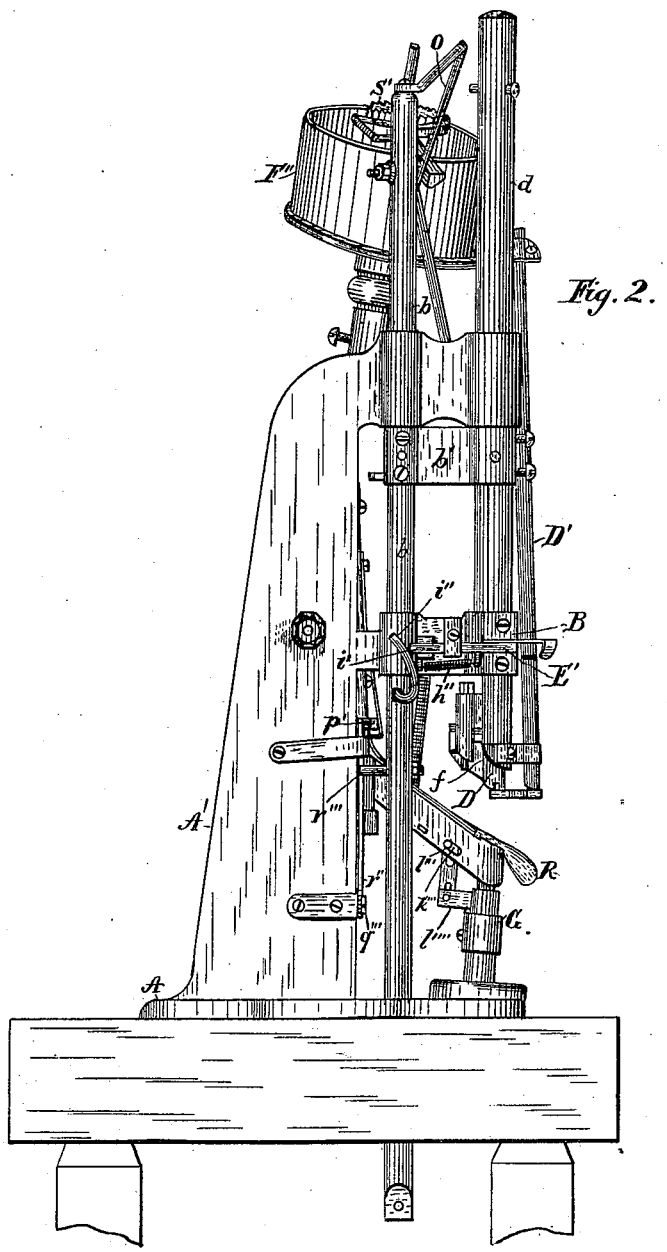
Figure 3:
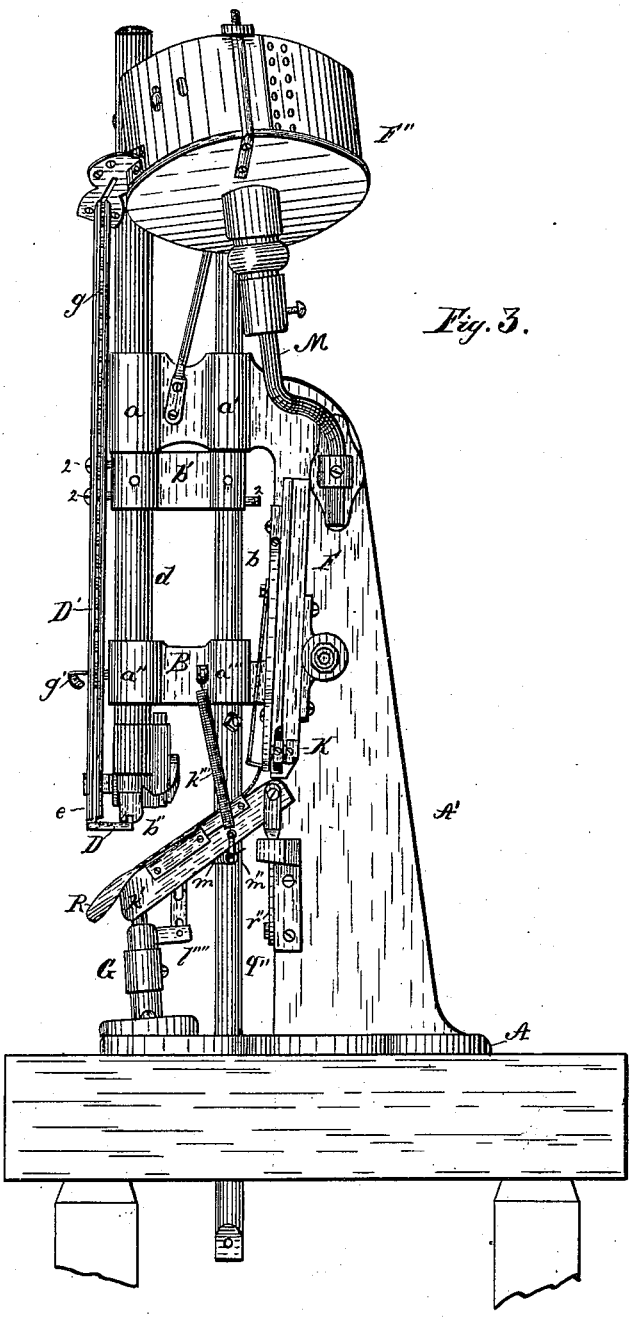
Figure 4:
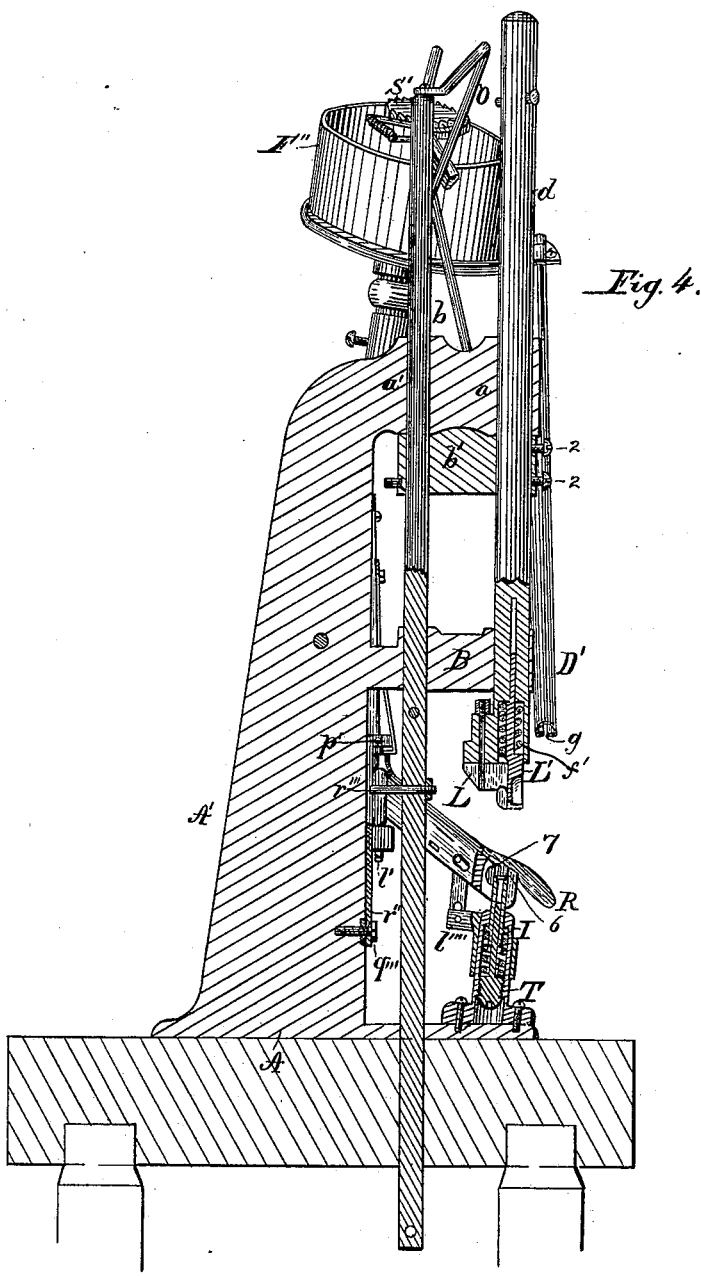
Figure 5:
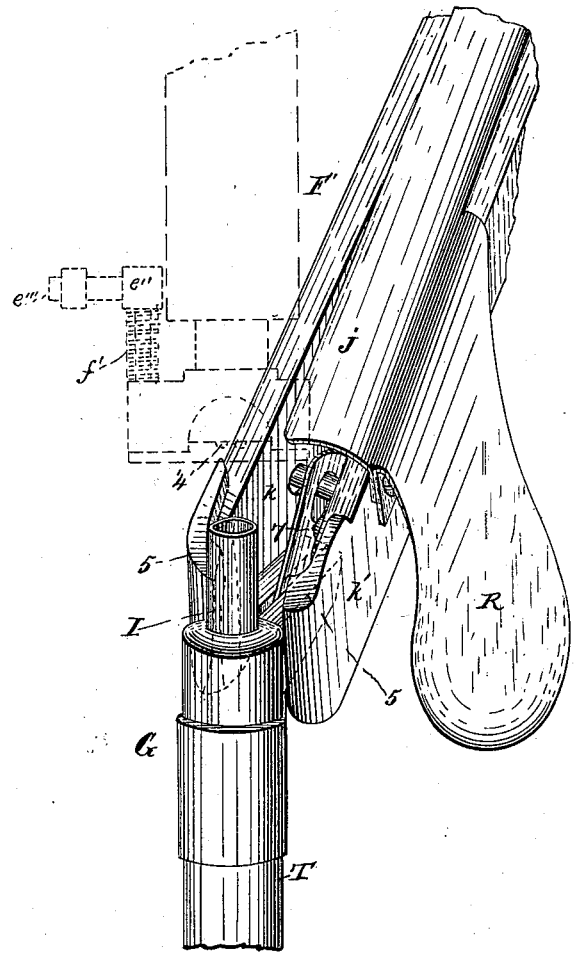
Figure 12:
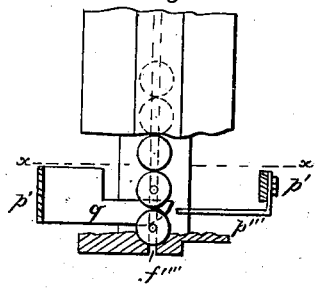
Figure 11:
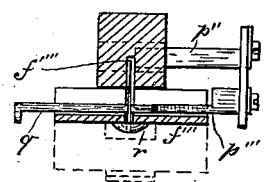
Figure 13:
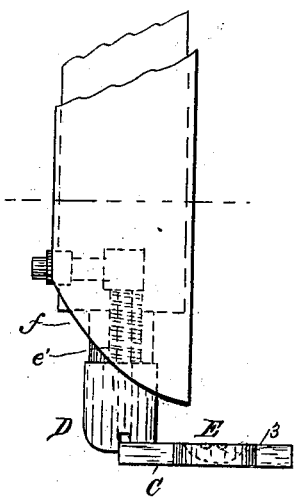
Figure 14:
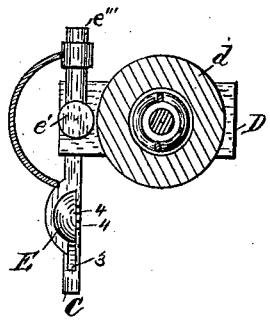
Figure 18:
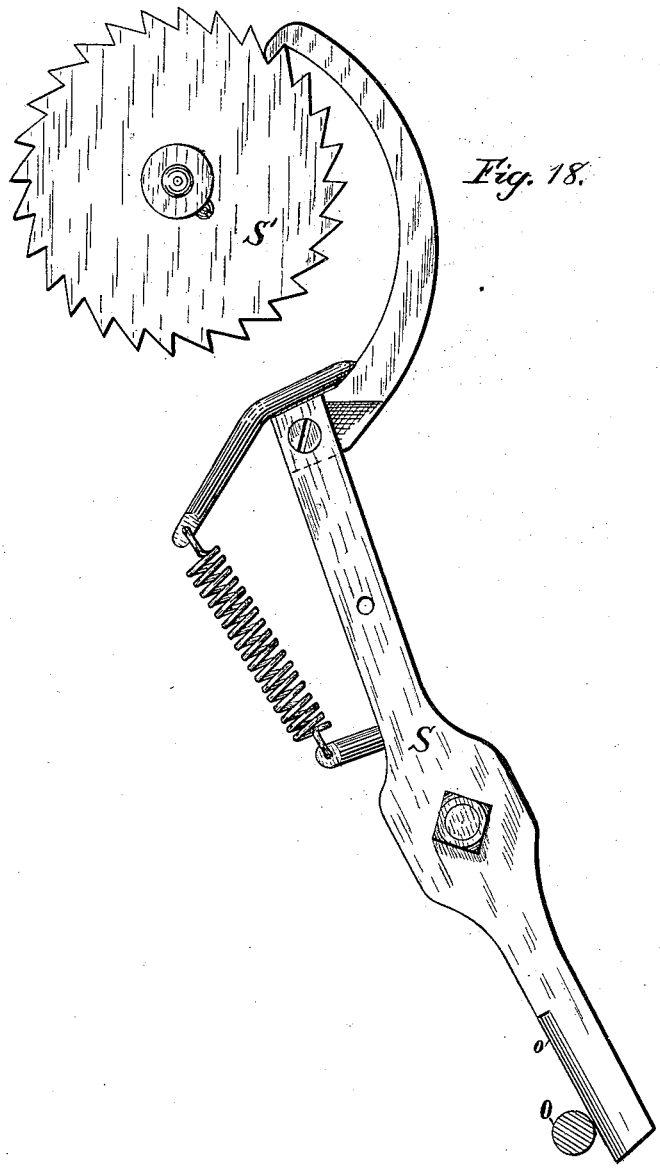

Figure 1 is a front elevation of our improved automatic button-attaching machine. Fig. 2 is a side elevation of the same. Fig. 3 is a side elevation on the side opposite to that shown in Fig. 2, with the supplemental fastener-carrier open, in dotted lines. Fig. 4 is a vertical section on the line $y\,y$ of Fig. 1. Fig. 5 is an enlarged perspective view of the fastening devices proper and the supplemental fastener-carrier pressed down from the fastening-point. Fig. 6 is an enlarged side elevation of the lower end of the fastener-carrier. Fig. 7 is a front elevation, enlarged, of the fastener-carrier and supplemental fastener-carrier. Fig. 8 is an enlarged vertical sectional view of the anvil and the upsetting plunger and head, specially illustrating the tipping forward of the anvil. Fig. 9 is an elevation of the fastener-feeder, showing the intermittent detent. Fig. 10 is an elevation of the fastener-carrier with the cover cut away, so as to show the series of fasteners passing to the intermittent feed-latch before feeding, the latch being closed. Fig. 11 is a sectional view of the fastener-carrier immediately above the cut-off latch, and looking toward said latch, in position at the moment of "cutting off" a fastener from those in the carrier. Fig. 12 is a sectional view of the fastener-carrier, showing the cut-off latch in plan at the moment of cutting off. Fig. 13 is an enlarged side elevation of the button-carrying latch and the cam that operates it. Fig. 14 is a cross-section on line $y\,y$ of Fig. 13. Fig. 15 is an enlarged front elevation of the button-latch and its direct operating mechanism. Fig. 16 is a detail view illustrating the means of operating the button cut-off. Fig. 17 is a detail view, showing the back of the button-chute and how it is cut away, and its relation to the button-carrying latch. Fig. 18 is a plan view, showing the details of mechanism for operating the button-hopper.

The object of our invention is to provide a machine to be worked by foot-treadle, hand, or power, which will automatically set button-fasteners to secure buttons to fabrics, and is to a great extent an improvement upon the machines described and claimed in Letters Patent issued to Wilkins and Miller February 24, 1885, No. 312,688.

Our invention consists in sundry details of construction and combinations of mechanical devices, as will hereinafter be fully described, and specifically pointed out in the claims.

In order that those skilled in the art may make and use our invention, we will proceed to describe the exact manner in which we have carried it out.

In the said drawings the frame of the machine consists of the bed-plate A and the gooseneck standard A'. In the head of the standard A' are two sleeves, $a\,a'$, to form bearings for two plunger-rods, $b\,d$, and lower down there is secured to the standard a bracket, B, provided with bearings or openings $a''\,a'''$, also being bearings for plunger-rods $b\,d$. The two plungers $b\,d$ are secured together by a movable yoke, $b'$, through which they pass, and to which they are held by set-screws 2 2, or they may be secured by pins or rivets after the adjustment between rods $b\,d$ has been determined. The plungers $b$ and $d$ are reciprocated synchronously by means of a pitman attached to rod $b$ and a treadle, or to an eccentric or other power mechanism. Upon the lower end of the rod $d$ is located the button socket or head, the button holding and carrying latch, and the fastener-upsetting die.

The construction and operation of the button-socket $b''$ and upsetting-die are substantially the same as that shown in patent issued February 24, 1885, to A. G. Wilkins and Jno. B. Miller, No. 312,688, while the latch swings in a horizontal plane automatically in this invention, in lieu of being turned by hand. The button-carrying latch has a movement in a horizontal plane through an arc of about forty-five degrees from the lower end, e, of the button-conductor D' to the fastening-point and return. This button carrying and sustaining latch turns on a spindle, e', which passes through one end of head D and terminates in an enlargement, e'', provided with a projecting pin, e''', having an anti-friction roller working against a semicircular curved cam, f, attached to the bracket B. Coiled around the spindle e' of the button-latch is a spring, f', having one end secured to head D and the other end secured to enlargement e'', so that the torsion of the spring will normally hold the end of the latch in the socket in the head D at the fastening-point in the absence of any intervening mechanical agency. The latch and its spindle e' and coiled spring f' reciprocate with plunger d, the pin e''' and anti-friction roller coming in contact with the face of the cam f as the plunger passes up, and thereby the latch is primarily pressed out of the recess in the lower face of head D, and then turned by the pressure of the cam until the button-receiving recess in the latch rests beneath the lower end of the button conductor, as seen in Fig. 2.

The button socket or recess E in the latch C is particularly illustrated in Fig. 13, and is formed with one side of the recess on a gentle incline, as seen at 3, so that the button on leaving the conductor D', with its eye in a vertical plane, will roll down this gentle decline into the button-socket E, and remain with the eye in a horizontal plane, the wire of the button-eye resting in the two small recesses 4 4 in the edge of the button-latch, which register with the recesses 4' 4' in the face of the button-recess in head D when the latch goes to the fastening-point. The lower end of the button-conductor D' is cut away on a curve at one side—in this instance the side next to the spindle e'—so that the button may move from the said end by rolling sidewise, and at the same time be supported by the protruding portion of the casing forming the conductor until it has well entered recess E. The button-conductor D' lies in a diagonal line, and has its upper end connected with a hopper or button-feeder, F, whence the buttons are fed to the conductor, with their eyes resting in slot g, by means of the automatic intermittent movement of a false bottom in hopper F, accomplished by mechanism hereinafter described. The slotted conductor-tube D' being kept filled with buttons by the feed from hopper F'', it is necessary that these buttons be delivered singly to the button-latch C, and this is accomplished by means of a cut-off consisting of two flat fingers, g' g'', which approach from opposite sides and pass into slots h h' in the button-conductor, the distance between the slots being sufficient to allow a single button to rest between, and one finger, g', or the other, g'', always being in the path of the descending buttons, and the distance being so gaged that as the lower finger, g', on which rests the lowermost button, recedes from slot h to let the button drop to the latch C, the upper finger, g'', passes into slot h', immediately behind the said lowermost button, and cuts off all buttons in the tube above it until the latch has carried the descending button to the fastening-point and returned to the lower end of conductor D'. The fingers g' g'' are attached to and operated by a sliding bar, E', moving in ways secured to bracket B, and normally held in the position seen in Fig. 2 by a coiled spring, h'', having one end secured to bar E' and the other end secured to the bracket. The rear end, i', of the sliding bar E' lies in the line of travel of a bent cam-bar, i''', attached to plunger b, and as plunger b is reciprocated the cam-bar i''' reciprocates bar E' and the button cut-off fingers g' g'', so as to release a button at each beat of the machine.

The mechanism for conducting the fastening-pins and washers to the fastening-point is as follows: Bolted or otherwise secured to the frame of the machine is a slotted conductor, F, provided with a cover, f''', so cut away that the washers can freely move over the surface of conductor F, while the pins protrude into slot f''''. To keep up a constant supply of fasteners to feed the machine, the slotted conductor F is constructed to receive at its upper end removable extensions (not shown) which succeed each other in place as each one is exhausted. At its lower end fastener-conductor F abuts against a supplemental conductor, F', made with two bars or wings, k k', having their upper ends pivoted at l l in yokes k'', which in turn are pivoted by pins l' l' to a projecting lump on the frame, whereby the said bars k k' have a movement both in a vertical and horizontal arc. By means of a coiled spring, m, having one end attached to arm m' on bar k and the other end attached to arm m'' on bar k', and interior stops, the inner faces of bars k k' only approach each other sufficiently close to form a slot through which rides the fastening-pin on its way to the anvil G, while the washer slides over the upper edges of the rods, the bar k' carrying a shield or cover, j, projecting over both bars and protecting the fastening-pins and washers from being interrupted by the fabric or other impediment in their travel through the supplemental conductor. The sides or bars k k' of the supplemental fastener-conductor F' are yieldingly sustained by a coiled spring, k''', the upper end of which is secured to a pin in bracket B, so that the enlarged hollow end of the supplemental conductor F' rests on and around the top of the anvil G, as shown in Figs. 1, 2, and 3, while a pin, l''', on bar k', protrudes through a slot, k'''', in bar k, and serves to keep the bars in a proper relative position to each other. Around pin l''', between bars k and k', is a link the opposite end of which is pivoted to an ear or projection, l'''', on the anvil, to limit the movement of the supplemental conductor F' in a vertical arc. At their upper ends the inner faces of bars $k$ $k'$ are cut away, so as to make the end of the slot flaring, to insure the entrance of the fasteners. The lower ends of bars $k$ $k'$ are broadened and curved, so as to embrace the spring-fastener holder I, protruding from the top of the anvil, and form an extended surface, 5 5, on which to settle the fabric when bringing it over the pin and the cylindrical opening 6, forming registers with the top of the fastener-holder I of the anvil, the slot formed by the space between the bars $k$ $k'$ cutting vertically into the rear of the said cylindrical opening 6, and within this slot, just at its juncture with the cylindrical opening, is a curved stop, 7, lying in the line of travel of the point of the fastening-pin, and which checks the point, so as to upset the pin and washer and throw the pin head first and the washer inverted into the holder I in the anvil, the point of the fastener being upward and ready for application.

The fastener-conductor F is intended to be constantly filled with the fasteners and washers, which must be fed to the supplemental conductor F' singly, to slide to the anvil. This is accomplished by a cut-off latch, K, which reciprocates back and forth in the end of conductor F, and cuts off a single fastener at a time and drops it into conductor F', to be conducted toward the anvil. The latch consists of a dovetailed bar, $p$, sliding in a transverse dovetail groove in the top $f'''$ of conductor F, to which are secured two rearwardly-projecting arms, $p'$ $p'$, supporting a sliding stop-bar, $p''$, which through proper openings crosses slot $f''''$ to arrest the point of the pin. In front of stop $p''$ is another stop-bar, $p'''$, which crosses slot $f''''$ and arrests the descending pin near its head, and also a cut-off plate, $q$, having a point straight on one edge and curved on the other, as seen in Fig. 12. The end of the stop-bar $p'''$ and the point of the cut-off plate $q$ slightly lap each other, the straight edge of the cut-off plate being slightly above the line of the stop-bar $p'''$, thereby leaving an opening between the curved edge of plate $q$ and the end of bar $p'''$ large enough for a fastener-pin to pass through at each alternate reciprocation of the dovetailed bar $p$ and its accompanying stop-bars.

Into the extreme lower end of the opening in the conductor F, through which the washers pass, there projects from the cover a curved-faced projection, $r$, curved to generally conform to the curvature of the washer and steady it, while immediately in front of the projection and washer-chute lies the rectangularly-bent end of a flat spring, $q'$, one end secured at 10 to form a detent, against which each washer shall rest in its downward movement prior to the dropping of the fastener into the supplemental conductor F'. The bent end of the spring $q'$ is made to rise and fall in time by means of a cam projection, $q''$, on the top of bar $p$, which lies beneath the flat spring $q'$. The bar $p$ and its attached stops and cam projection are kept normally in the position shown in Fig. 9, by means of a flat steel spring, $r'$, having one end secured and the other end bearing against dovetailed bar $p$.

To reciprocate the fastener-feed cut-off there is a vibrating bar, $r''$, pivoted at its lower end to the frame at $q'''$, and having its free end abutting against bar $p$, and moved to the right at each upward impulse of the plunger $b$ by means of a pin, $r'''$, on said plunger and bearing against the edge of bar $r''$, so that as the plunger $b$ rises the bar $p$ and accompanying stops are forced to the position seen in Figs. 1 and 7, and a fastener is dropped into the supplemental conductor by the cut-off. As the plunger $b$ descends, the flat spring $r'$ throws bar $p$ and the accompanying stops in the opposite direction, and another fastener passes to the delivery-point. The reciprocation of the bar $p$ simultaneously withdraws the stops $p'''$ $p''$ and the washer-detent from the path of the travel of the fastener and returns them to said path in time.

To the bar $k'$ of the supplemental fastener-carrier F' is secured a plate or hand-piece, R, with which the operator's knuckles or palm comes in contact and depresses the supplemental conductor F' away from the fastening-point, as seen in Fig. 5.

A special element of our invention is embodied in the peculiar manner in which the anvil is set in relation to the vertically-moving plunger $d$, carrying the upsetting-die. This anvil, as in Patent No. 312,688, heretofore set out, consists of an exterior barrel, T, a central rod or pin, $t$, which sustains the fastening-pin while being upset, and a spring sleeve or holder, I, within which rests the pin, and in the recessed head of which, at $t''$, rests the washer. All these elements of the anvil are arranged concentrically, having a common axial line; but this axial line is not coincident with or parallel to the axial line of the upsetting-plunger $d$. The upper end of the anvil is tipped forward until its axial line varies about three degrees from the axial line of the upsetting-plunger $d$, and its base is within the line of plunger $d$ toward the standard A', so that its upper end registers properly with the upsetting end of plunger $d$, when it is brought down to place the button and upset the fastener. This tipping of the anvil forward performs an important office in insuring a certainty of fastening by holding the pin out of line with the axis of the plunger, and with its point thrown slightly forward, giving it a tendency to pass through the button-eye close to the button and cause the point to impinge against the curved face of the upsetting-die L in a line of comparatively high angularity, so that the point of the pin is curled backward to the best advantage, with the button-eye acting as a mandrel or resisting medium around which to curl the pin by means of the continued pressure and advance of the die L. The spring-bolt L', slotted to receive the die L and carrying the head D, works within the lower end of plunger d, in the well-known manner shown in the patent heretofore referred to. The button hopper or feeder is supported on a rigid or adjustable arm, M, extending from the frame of the machine in a convenient position to give the button-conductor the proper inclination. A bar or plate, N, extends across the top of the hopper and projects over the side toward the standard of the machine and supports a pivoted vibrating spring-lever, S, having on one end a curved spring-pawl, s, for engaging with the teeth of a ratchet-wheel, S', on the spindle of an intermittently-moved disk at the bottom of the hopper, and on the other end a diagonal face, o, to receive the diagonal face of a diagonal cam-bar, O, at the top of plunger b, so that at each downward stroke of the plunger b the lever S is vibrated and the curved pawl turns ratchet-wheel S' a partial revolution, and with it the disk at the bottom of the hopper, to feed the buttons to the conductor. The button-conductor being filled with buttons and the fastener-conductor F filled with the fasteners, and the machine in position shown in Figs. 1, 2, 3, and 4, one reciprocation of plungers b and d drops a button into the button-carrying latch and a fastener into supplemental conductor F', whence it slides to and upsets into the fastener-holder within the anvil, the parts returning to the positions shown in Figs. 1, 2, 3, and 4. The operator then places the fabric over the head of the anvil and at the fastening-point, and by pressing down upon it the supplemental fastener-carrier recedes in the arc of a circle of which the pivots l l are the center, leaving the fabric supported on the end of spring-sleeve I. Then by means of the proper application of power plunger d is brought down, and as this progresses the pin $e'''$ and antifriction roller on the spindle $e'$ of the button-carrying latch are relieved of the pressure of cam-face f, and the torsion of spring $f'$ whirls the latch and its contained button into the bearings for it in head D, where it securely holds the button to the fastening-point. The plunger d moves on with the button down to the anvil, where the pin passes through the fabric and button-eye and is upset by the curved face-die. Meantime the cam-arm on plunger d has operated the button cut-off latch to close the conductor, and pin $r'''$ has withdrawn its pressure from bar $r''$, so that the spring $r'$ throws the fastener cut-off latch in a position (seen in dotted lines) to receive a fastener, ready for delivery to the supplemental conductor on the upstroke. Every stroke of the plunger b, through the medium of cam-bar O, the spring-pawl s, lever S, and ratchet-wheel S', intermittently turns the disk at the bottom hopper and feeds the buttons to the conductor.

Having thus described our invention, what we claim as new, and desire to secure by Letters Patent, is—

1. In an automatic button-fastening machine, a button-conductor, in combination with an automatic vibrating button-latch to carry the button from the button-conductor to the fastening-point, and a curved face-cam, f, substantially as described.

2. The button-latch provided with a recess to receive the button, and an inclined way, 3, for the button to pass down, as specified.

3. The button-latch provided with spindle $e'$ and pin $e'''$, in combination with coiled spring $f'$, to exercise an upward and torsional spring-pressure on said spindle, cam f, and button-conductor D', all constructed, arranged, and operated as set forth.

4. The button-conductor D', provided with slots h h', in combination with cut-off fingers $g'\ g''$, entering said slots, sliding bar E, moving in ways on the frame, coiled spring $h''$, cam-bar $i''$, and plunger b, all constructed, arranged, and operated substantially as and for the purpose described.

5. In a button-fastening machine, the plungers b d, in combination with the movable yoke b', for adjusting the relation between the plungers, as specified.

6. The fastener-conductor F, in combination with the sliding transverse bar p, having arms $p'\ p'$ and carrying stop-bars $p''\ p'''$, cut-off plate q, and means for reciprocating the same, all constructed, arranged, and operated as set forth.

7. The fastener-conductor F, in combination with the rectangularly-bent spring $q'$, and transverse bar p, provided with cam-projection $q''$, and devices for reciprocating said bar p, as described.

8. The fastener-conductor F, in combination with a supplemental fastener-conductor, F', pivoted so as to have a movement in a vertical arc, substantially as set forth.

9. The supplemental fastener-carrier F', consisting of the two bars k k', pivoted at l l and l' l', to move through both a vertical and horizontal arc, and their inner faces parted by stops to form a conveying-slot, as described.

10. In a button-fastening machine, substantially as described, the supplemental fastener-carrier F', provided with a shield or cover, j, secured to one of the bars k', to protect the fastener-heads, as described.

11. In a button-fastening machine, substantially as described, the supplemental fastener-carrier F', having a downwardly-yielding movement, in combination with a thumb-plate, R, to depress said carrier in the act of applying the goods to the anvil, as set forth.

12. In a button-fastening machine, substantially as described, the slotted supplemental fastener-carrier, in combination with a curved stop at 7, or near its juncture with the anvil, to tumble the fasteners head first into the fastener-holder I, as described.

13. The button-conductor D', having its lower end at one side cut away in a curve, 18, in combination with a button-latch, substantially as set forth.

14. The supplemental fastener-carrier F', in combination with the anvil and connecting-link, to limit the vertical movement of the supplemental carrier, as specified.

15. The button feeder or hopper having a rotating disk in its bottom, and a ratchet-wheel on the same spindle, in combination with spring-lever S, spring-pawl s, cam-bar O, fastened to the top of plunger b, and plunger b, all constructed, arranged, and operated as and for the purpose described.

16. In a button-fastening machine, substantially as described, a stationary anvil and a fastener-holder having their axial line in an acute angle to the axial line of the fastening-plunger, whereby the fastening-pin is slightly inclined in approaching the fastening or upsetting die, as set forth.

ALEXANDER G. WILKINS.
MARCUS J. BARTLETT.

Witnesses:
J. B. MILLER,
GEO. O. RICE.